(12) United States Patent
Bischoff et al.

(10) Patent No.: US 10,990,910 B2
(45) Date of Patent: Apr. 27, 2021

(54) DELIVERY VEHICLE AND METHOD FOR DELIVERING CONSIGNMENTS AT DIFFERENT LOCATIONS ON A DELIVERY ROUTE

(71) Applicants: Heike Bischoff, Cologne (DE); Sandra Drees, Königswinter (DE); Boris Trendafilov, Bonn (DE); Holger Schneebeck, Cologne (DE); Antje Huber, Bonn (DE)

(72) Inventors: Heike Bischoff, Cologne (DE); Sandra Drees, Königswinter (DE); Boris Trendafilov, Bonn (DE); Holger Schneebeck, Cologne (DE); Antje Huber, Bonn (DE)

(73) Assignee: Deutsche Post AG, Bonn (DE)

( * ) Notice: Subject to any disclaimer, the term of this patent is extended or adjusted under 35 U.S.C. 154(b) by 387 days.

(21) Appl. No.: 15/614,787

(22) Filed: Jun. 6, 2017

(65) Prior Publication Data

US 2017/0357919 A1    Dec. 14, 2017

(30) Foreign Application Priority Data

Jun. 8, 2016 (DE) .................. 10 2016 110 567.8

(51) Int. Cl.
| | |
|---|---|
| G06Q 30/00 | (2012.01) |
| G06Q 10/04 | (2012.01) |
| B60P 3/00 | (2006.01) |
| B07C 3/08 | (2006.01) |
| G01C 21/34 | (2006.01) |
| G06Q 50/32 | (2012.01) |

(52) U.S. Cl.
CPC ............. *G06Q 10/047* (2013.01); *B07C 3/08* (2013.01); *B60P 3/007* (2013.01); *G01C 21/343* (2013.01); *G06Q 50/32* (2013.01)

(58) Field of Classification Search
CPC ............................ G06Q 10/047; G06Q 50/32
USPC ...................................................... 705/338
See application file for complete search history.

(56) References Cited

U.S. PATENT DOCUMENTS

| | | |
|---|---|---|
| 6,711,459 B1 | 3/2004 | Gomez |
| 9,371,193 B2 | 6/2016 | Ragan |

(Continued)

FOREIGN PATENT DOCUMENTS

| | | |
|---|---|---|
| CN | 101279668 A | 10/2008 |
| CN | 105084019 A | 11/2015 |

(Continued)

*Primary Examiner* — Rokib Masud
(74) *Attorney, Agent, or Firm* — Reinhart Boerner Van Deuren P.C.

(57) ABSTRACT

The invention relates to a delivery vehicle for delivering consignments at different locations on a delivery route, having at least one receiving device for receiving the consignment, having at least one sensor device for separately capturing delivery information for the consignments received via the receiving device, having at least one storage device for storing the received consignments during the delivery of other consignments, and having at least one conveying device for conveying the received consignments from the receiving device to storage positions in the storage device and from the storage positions in the storage device to a dispensing device for dispensing the consignments at the particular location for delivery of the consignments.

18 Claims, 7 Drawing Sheets

(56) References Cited

U.S. PATENT DOCUMENTS

| | | | | |
|---|---|---|---|---|
| 2001/0017507 A1* | 8/2001 | Hara | ............... | G07C 9/27 |
| | | | | 312/326 |
| 2005/0131645 A1 | 6/2005 | Panopoulos | | |
| 2009/0048890 A1* | 2/2009 | Burgh | ............. | G06Q 10/06316 |
| | | | | 705/7.15 |
| 2009/0127327 A1* | 5/2009 | Rani | ............... | G06Q 10/08 |
| | | | | 235/375 |

FOREIGN PATENT DOCUMENTS

| | | |
|---|---|---|
| CN | 204751198 U | 11/2015 |
| DE | 93 02 336 U1 | 7/1993 |
| DE | 93 06 949 U1 | 9/1994 |
| DE | 10 2010 015 584 A1 | 10/2011 |
| DE | 10 2010 030 776 A1 | 1/2012 |
| DE | 10 2014 106 689 A1 | 11/2015 |
| EP | 0 484 673 A1 | 5/1992 |
| FR | 2 672 551 A1 | 8/1992 |
| GB | 732638 A | 6/1955 |
| JP | 2008-80300 A | 4/2008 |

\* cited by examiner

DELIVERY VEHICLE AND METHOD FOR DELIVERING CONSIGNMENTS AT DIFFERENT LOCATIONS ON A DELIVERY ROUTE

CROSS-REFERENCE TO RELATED PATENT APPLICATION

This patent application claims priority to German Application No. 10 2016 110 567.8, filed Jun. 8, 2016, the entire teachings and disclosure of which are incorporated herein by reference thereto.

FIELD OF THE INVENTION

The invention relates to a delivery vehicle for delivering consignments at different locations on a delivery route. Furthermore, the invention relates to a method for delivering consignments at different locations along a delivery route with a corresponding delivery vehicle.

BACKGROUND OF THE INVENTION

In order to deliver consignments at different locations along a delivery route, various delivery vehicles are used. The delivery vehicles make different delivery rounds, wherein each delivery round can be based on a different delivery route. The type of delivery vehicle also depends on the type of consignments that are intended to be delivered along the delivery route. The delivery route generally leads over public roads. It is thus preferably not what is referred to as in-house transport, i.e. goods transport within a factory and/or company. For the latter, very specific delivery vehicles are typically used, which are not suitable for transport over longer distances and are regularly also not suitable for very different consignments.

In the present document, consignments are understood as being basically different items which are preferably transported with reasonable effort. In particular the consignments can be in the form of articles or packages. These include items for everyday use, such as consumables or foodstuffs, and also technical items and equipment. In many cases, the consignments are consignments to be delivered by a postal company, which may be referred to as postal consignments. If appropriate, the consignments are letters, parcels and/or printed products. In this case, parcels also include packets, while printed products can also be leaflets, brochures and periodicals. In addition, a letter may also be a postcard. Parcels and other consignments are in many cases packaged goods, wherein the consignment then comprises the packaging and the goods packaged therein. When some of these consignments, in particular consignments of a postal company, parcels, letters and/or printed products, are dropped off at their intended location, for example the destination address or the addressee's premises, this is usually referred to as the delivery of the consignment. Other consignments are said to be handed over or dropped off. This distinction is merely of minor importance in the present case, especially since the boundaries between delivering, handing over or dropping off, if they actually exist, cannot be drawn precisely and the drawing of distinctions or precise boundaries is not important or only of minor importance for the present invention.

If the consignments are not too large, as is the case for example with parcels, the consignments can be stowed in a shelving system in a loading space of the delivery vehicle. Along the delivery route, the consignments are removed from the shelves of the shelving system and delivered. Usually, the shelves are provided on both sides of the delivery vehicle and separated from one another by a central aisle, such that the driver of the delivery vehicle can remove the consignments from the shelves. A delivery vehicle usually makes several different delivery rounds one after another in order to be able to deliver all the consignments. After every journey, or after every delivery round, the delivery vehicle has to travel back to a distribution center or a storage facility for the consignments, for example a warehouse, in order to pick up further consignments there and to stow them in the shelving system. Repeated loading of the delivery vehicle is very time-consuming and accordingly also very expensive. This is because the consignments are typically loaded individually by hand, specifically in an arrangement and/or order related to the delivery route subsequently to be followed, such that the consignments can be unloaded more easily and reliably along the delivery route. Nevertheless, the exact delivery route is in most cases established after all of the consignments have been loaded, specifically on the bases of the consignments loaded in each case and respective delivery locations.

Before the delivery vehicle is loaded, it is thus necessary to presort the consignments. Presorting takes into consideration the delivery route to be followed on the next delivery round, wherein the delivery route to be followed is established on the basis of the delivery information for the consignments. However, the exact sorting and thus also the exact delivery route are only established, if appropriate, when the consignments are loaded into the delivery vehicle. The locations at which the consignments are intended to be delivered or dropped off determine the delivery route to be followed, in order that unnecessary distances are avoided and the time required therefor is saved. Therefore, presorting takes place in accordance with predetermined criteria, for example on the basis of different areas or roads which can expediently be successively traveled through or along, provided that consignments need to be delivered anywhere there. Therefore, presorting requires a degree of experience on the part of the deliverer, and for this reason presorting is also carried out by the deliverer, who subsequently follows the delivery route with the delivery vehicle. This is intended to ensure that the delivery takes place along a delivery route that is short and quick to negotiate, i.e. efficient. Specifically, the deliverer can use their experience to define an expedient delivery route which might be objectively longer but is quicker to negotiate.

Nevertheless, in order to further increase effectiveness, there is a desire to reduce the idle times of the delivery vehicles. This can be achieved in that, for example, presorting is accelerated or already presorted consignments are received by the deliverer, even if the deliverer might have sorted these consignments even more expediently. However, the effectiveness of the delivery of a set of consignments at different locations along delivery routes has not yet been satisfactorily solved.

BRIEF SUMMARY OF SOME EXEMPLARY EMBODIMENTS OF THE INVENTION

Therefore, the invention is based on the object of configuring and developing the delivery vehicle and the method for delivering consignments, in each case of the type mentioned at the beginning, so as to allow more effective delivery of consignments at different locations along delivery routes.

This object is achieved according to embodiments described in the claims by a delivery vehicle for delivering consignments at different locations on a delivery route, having at least one receiving device for receiving the consignments, having at least one sensor device for separately capturing delivery information for the consignments received via the receiving device, having at least one storage device for storing the received consignments during the delivery of other consignments, and having at least one conveying device for conveying the received consignments from the receiving device to storage positions in the storage device and from the storage positions in the storage device to a dispensing device for dispensing the consignments at the particular location for delivery of the consignments.

In addition, said object is achieved according to a method for delivering consignments at different locations along a delivery route with a delivery vehicle,
 in which the consignments to be delivered are transferred to the delivery vehicle in an unsorted manner via at least one receiving device of the delivery vehicle,
 in which delivery information for the received consignments is captured separately by at least one sensor device,
 in which the consignments are conveyed to storage positions in the at least one storage device by at least one conveying device,
 in which the consignments are temporarily stored in the storage positions,
 in which the consignments are conveyed from the storage positions to at least one dispensing device by the conveying device, and
 in which the consignments conveyed to the dispensing device are dispensed at different locations on the delivery route.

The invention has recognized that the effectiveness of delivering consignments along a delivery route can be improved in that it is possible to entirely dispense with presorting of the consignments before they are received by the delivery vehicle or before they are transferred to the delivery vehicle. However, this is paid for in that a type of sorting has to take place in the delivery vehicle. This is not only complicated on account of the space conditions but also requires higher structural outlay with regard to the delivery vehicle, in order that a type of sorting can be carried out in the delivery vehicle.

Furthermore, the invention has recognized that, in spite of these supposed drawbacks, the effectiveness can be enhanced by sorting being very greatly simplified. In this way, delivery can ultimately be speeded up as a whole and it is additionally possible to ensure that the structural outlay with regard to the delivery vehicles is limited to a reasonable amount as far as the sorting to be carried out in the delivery vehicles is concerned. In order to transfer the consignments to the delivery vehicle, for instance in a distribution center or a storage facility for the consignments, for example a warehouse, the delivery vehicle is equipped with a receiving device.

Via the receiving device, the consignments are received by the delivery vehicle, after which the actual processing of the consignments takes place in the delivery vehicle. In this processing, the consignments are captured by at least one sensor device which can, if appropriate, be integrated into the receiving device. In order that all of the consignments can be captured, the sensor device can have a sufficient number of sensor elements and/or a sufficient number of sensor devices can be provided. Alternatively or additionally, however, it is appropriate to guide the consignments as far as possible individually and/or as far as possible successively past the at least one sensor device, such that all of the consignments can be captured reliably.

During the capturing of the consignments, at least delivery information for the consignments is captured. This delivery information at least specifies the location at which the consignments need to be dispensed or delivered. However, further information relating to the manner of delivery can also be captured. For example, it is possible to capture the recipient of the delivery, or where and how the consignment should be left at the delivery location in order to be picked up by the addressee, if necessary at a later time. The consignments can for example be delivered to any persons who are met at the delivery locations or only to predetermined persons in person. It is also possible for the consignments to be left at the delivery location, in particular left in a parcel box, a Packstation or some other facility at the delivery location. The received consignments are transferred to a storage device in the delivery vehicle with the aid of at least one conveying device and are temporarily stored in storage positions until they need to be dispensed or delivered, i.e. at the delivery location along the delivery route which corresponds to the delivery information.

The storage position at which a consignment is temporarily stored can be dependent on the captured delivery information of the particular consignment. It is then possible for consignments to be temporarily stored in the storage device for example in the order in which the consignments are subsequently delivered or dispensed. However, it is also possible for another sorting operation to take place on the basis of the delivery information. The received consignments are processed particularly easily and quickly when the consignments are assigned simply in order to successive or even any desired storage positions in the storage device. In principle, the consignments can even be temporarily stored in a completely unsorted manner in the storage device.

The delivery information relating to the delivery, in particular the delivery location, can be linked with any desired storage position which is assigned to the particular consignment. The assignment of the delivery position to a storage position can in this case take place directly or indirectly via the consignment. It is thus possible to capture and/or save which consignment is temporarily stored at which storage position, and it is also possible to record which delivery information is assigned to which consignment. When a consignment is intended to be delivered because the delivery vehicle is at the delivery location or in the vicinity of this location, it is possible to check which storage position the consignment with the corresponding delivery information is assigned to, in order to dispense the consignment from this storage position onto the at least one conveying device. However, it is also possible to directly determine which storage position the delivery information is assigned to that belongs to the consignment to be delivered next, and for the consignment in this storage position to be dispensed onto the at least one conveying device.

Via the conveying device, the consignments are transported from the particular storage positions in the storage device to a dispensing device for dispensing the consignments at the particular delivery location for the consignments. For the sake of simplicity, it is a conveying device which can also serve to transport the consignments from the receiving device to the particular storage position. It is particularly preferred from a structural point of view for only one conveying device to be provided in order to convey the consignments to the storage positions and to convey the consignments from the storage positions to the dispensing device. In this case, too, it is possible for the at least one conveying device to be formed by a series of separate conveying elements. These conveying elements are then preferably arranged in succession along a conveying path, however. This can be the case, if appropriate, where a consignment can be conveyed directly from the receiving device to the dispensing device without the consignment having to be dispensed into a storage position in the storage device. Thus, it is also possible for example for the conveying device itself to provide storage positions. However, without storage positions in the storage device, unsorted reception and subsequently sorted dispensing of the consignments is only possible to a limited extent, if at all.

For better understanding and to avoid unnecessary repetitions, the delivery vehicle and the method for delivering consignments are described together in the following text, without in each case distinguishing specifically between the delivery vehicle and the method. However, it will be clear to a person skilled in the art from the context which features are preferred in each case with regard to the delivery vehicle and with regard to the method.

In a first particularly preferred delivery vehicle, the sensor device has at least one optical sensor. This allows easy, reliable and cost-effective capturing of the delivery information for example printed on or stuck to the consignments. Alternatively or additionally, it is preferred for the consignments to have delivery information in the form of 2D barcodes and/or 3D barcodes. These are easy to apply and can be read reliably. In order to ensure that the delivery information is also captured by the at least one sensor device, it may be appropriate for the delivery information to be provided on several sides of and/or at several points on the consignments.

In order to exploit the force of gravity when transporting the consignments from the receiving device to the dispensing device, with the result that the at least one conveying device connecting the receiving device and the dispensing device together can be configured in a simpler manner, it is appropriate for the receiving device to have an opening, provided in the roof of the delivery vehicle, for receiving the consignments via the roof.

Alternatively or additionally, the receiving of the consignments can take place via a side wall and/or via a rear wall.

In this case, the receiving device is preferably assigned to an upper periphery of the corresponding side wall or of the corresponding rear wall. In the case of a side wall or rear wall, too, it is appropriate for the latter to have an opening for feeding the consignments to the receiving device. Whether it is provided in the roof, in a side wall or in the rear wall of the delivery vehicle, the opening is preferably closable by a closure device. It is then possible for the penetration of moisture and dirt to be avoided while the delivery vehicle is following the delivery route or is on the delivery round.

The at least one conveying device can be configured such that the consignments are conveyed from an upper receiving device to a lower dispensing device. This is easy and reliable and allows the force of gravity to be exploited. In this case, the consignments can be conveyed in steps. Thus, for example, provision can be made for the consignments to be conveyed over different levels in the delivery vehicle, specifically again preferably from top to bottom. Along the corresponding levels, the consignments can be fed for example to the individual storage positions in the at least one storage device, wherein the storage positions are also arranged at least substantially on the levels of the at least one conveying device. In order to further convey the consignments downward from level to level, it is appropriate, for the sake of simplicity, for the conveying device to have several conveying elements in the form of chutes and/or roller conveyors.

The conveying device can have at least one conveying element in the form of a conveyor belt, at least one tilt tray conveyor and/or a roller conveyor. This serves for easy and reliable handling of the consignments. In a tilt tray conveyor, tilt trays are provided to convey the consignments, which are connected together and are transported in succession in the transporting direction. The tilt trays can additionally be tilted to at least one side in order to cause the consignments to slide down to the side from the tilt trays. In this connection, it is particularly appropriate for the tilt trays to be able to be tilted to opposite sides. From the tilt trays, the consignments can slide down into storage positions in the at least one storage device. In this case, the storage device can, if appropriate, likewise have tilt trays, wherein each tilt tray can provide a storage position. It is then possible for the consignments to be dispensed onto the conveying device from the tilt trays of the storage device, again by tilting the tilt trays, specifically, if appropriate, in each case into an empty tilt tray of the corresponding conveying device. Independently of the tilt trays, it is also possible for other guiding means such as slides, entrainers or the like to be provided in order to dispense the consignments from the at least one conveying device onto the at least one storage device and/or vice versa.

When use is made of a roller conveyor, the latter can have at least also omni wheels, which are also known as omnidirectional wheels, in order for it also to be possible to direct the consignments to the side in a targeted manner when they are transported along the roller conveyor. Corresponding roller conveyors are accordingly also referred to as omnidirectional conveyors. In an omnidirectional wheel, a plurality of rollers are distributed along the running surface of the wheel and around the circumference of the running surface, the axes of rotation of said rollers being inclined with respect to the axis of rotation of the omnidirectional wheel, in particular by at least 45°, preferably being arranged at least substantially at right angles to the axis of rotation of the omnidirectional wheel. The preferred omnidirectional wheel can thus drive the consignment arranged on the wheel in a direction which is oriented tangentially to the circumference of the omnidirectional wheel in the region of the contact surface between the omnidirectional wheel and the consignment, specifically in particular parallel to the transporting plane of the consignment along the omnidirectional conveyor. By contrast, no appreciable force can be transmitted perpendicularly thereto in the same plane. In this direction, the consignment slides over at least one roller on the circumference of the omnidirectional wheel. When a correspondingly large number of omnidirectional wheels having differently oriented axes of rotation are provided, the consignments can be moved in a highly targeted and virtually unrestricted manner along the omnidirectional conveyor, specifically in particular when the omnidirectional conveyor is oriented at least substantially horizontally.

In addition, it is preferred for the consignments to always rest on a plurality of omni wheels and/or for the axes of rotation of the omni wheels to point in at least three different directions which are, more preferably, each offset with respect to one another at an angle of at least substantially 120° and/or 60° and are arranged at least substantially in a common plane. Alternatively or additionally, provision can also be made for the omni wheels to be rotated at least partially at different circumferential speeds about their axes of rotation. As a result of this, too, different movement components can be transmitted to the components by the omni wheels in order to guide said consignments along a particular path.

The abovementioned conveying elements of the conveying device can, if appropriate, be provided on at least one level of the conveying device and/or form the corresponding level. When the level is formed by at least one omnidirectional conveyor, this can also be referred to as an omnidirectional floor, on which the consignments can then be transported along virtually any desired movement path, wherein each consignment can, if appropriate, be transported along a different movement path than at least some or even all of the other consignments. The transport of a consignment can be moved in any direction along the plane of the roller conveyor, wherein this direction can, if appropriate, change continuously during transport. The consignments can be moved in a targeted manner to a storage position on the omnidirectional floor. In this case, the size, in particular the footprint, of the consignments can be taken into consideration. This means that smaller consignments can be moved into mutually adjoining storage positions that are located closer together, while larger consignments can be moved into mutually adjoining storage positions that are further apart from one another. Thus, the area available for storage can be exploited better. In order to determine the size of the consignments, said size can be captured directly, specifically for example by means of at least one sensor, in particular an optical sensor. In this case, the storage device can be formed in a very flexible manner by the conveying device. There are thus no fixed storage positions and it is also possible, if appropriate, to guide consignments along a non-rectilinear path past the consignments of a level that are arranged in the storage positions, without undesired collisions occurring. However, in principle, the storage device can also be formed at least in part by at least one conveying element other than an omnidirectional conveyor. Moreover, it is in principle preferred for the storage positions to be provided on both sides of a central strip which can optionally be formed by the same conveying element or a different conveying element.

In order for it to be possible to handle the consignments reliably, the at least one conveying device, the at least one storage device or additional handling devices can have at least guiding means for dispensing the consignments from the conveying device to particular storage positions in the storage device and/or from particular storage positions in the storage device to the conveying device. The guiding devices thus ensure, if appropriate, that a consignment is moved to a storage position in the storage device by the conveying device at the desired point. Alternatively or additionally, however, the guiding devices can also ensure that the consignments are dispensed from their storage positions in the at least one storage device to the at least one conveying device when the consignments are intended to be passed on to the dispensing device. The guiding devices can in this case be actuated via a control device such that organized dispensing of the consignments from the conveying device to particular storage positions and from the particular storage positions back to the conveying device or to a different conveying device at a given time can be ensured.

Alternatively or additionally, a control device for controlling the conveying device so that the consignments are stored in particular storage positions in the storage device can be provided. Thus, for example, the control device predetermines the storage position up to which a particular consignment is transported. In a simple case, this can be the next and/or last free storage position in the storage device, or a storage position that is suitable for the consignment or is suitable in relation to the delivery information for the consignment. The transfer of the consignment from the conveying device to the corresponding storage position can then likewise be controlled by this control device. In this case, the transfer can be effected, if appropriate, by the conveying device, by the storage device, by a guiding device and/or a combination of these devices. In particular if the conveying device and the storage device are merged to form one unit or device, it is not always possible to clearly define whether the transfer of the consignment is effected by a conveying device or a storage device, because the conveying device and the storage device are not separated from one another. The transition between the conveying device and the storage device is, if present at all, smooth under certain circumstances.

Alternatively or additionally, the at least one control device can also control the dispensing of consignments from the storage position in the storage device to the conveying device and in particular predetermine this in relation to the order and/or temporal sequence. Thus, the dispensing of the consignments from the storage device to the conveying device can be adapted to the delivery route and to the reaching of the delivery locations for the consignments. Analogously to the transfer of the consignments from the conveying device to the storage positions, the transfer from the storage positions to the conveying device can, alternatively or additionally, be effected by the conveying device, by the storage device, by a guiding device and/or a combination of these devices. Here too, the type of transfer can affect how the at least one conveying device and/or the at least one storage device is configured.

Alternatively or additionally, at least one sensor device having at least one sensor can be provided, in order to capture storage information for the consignments. The control device can then use the storage information to define the storage position in which a consignment should be temporarily stored. The storage information can correlate for example with the size, the footprint, particular dimensions, for instance the length and width of the consignments. Thus, the consignments can be accommodated in a space-saving manner in the delivery vehicle. There can be for example different storage positions for consignments of different sizes. In the case of tilt trays, it is possible for example for tilt trays that define storage positions to be provided in different sizes. On the basis of the storage information, a consignment is now assigned to a particular free tilt tray which is suitable for the consignment of the corresponding size. The same principle can, however, also be applied without the use of tilt trays. For example, it may be expedient to separate the storage positions at least partially by way of separators such that a consignment cannot slip from one storage position into an adjacent storage position. It may be particularly expedient for at least substantially all storage positions to be separated from other storage positions by corresponding separators. Alternatively or additionally, at least two consignments can be temporarily stored, or stored, at least substantially in storage positions separated from one another via at least one separator. In the case of an omnidirectional floor, the consignments can be mounted in a manner immediately adjoining one another. The consignments can in this case prevent each other at least substantially from slipping. If, in this case, consignments of different sizes have to be handled for a delivery round, it may be advantageous to assign no fixed separate storage positions to the omnidirectional floor. Instead, the consignments are then packed as tightly as is possible or so that accidentally slipping of the consignments can be prevented sufficiently. The space on the omnidirectional floor that is taken up in each case by the corresponding consignments then forms the particular storage position for the particular consignment. Therefore, during the next delivery round, the storage positions on the omnidirectional floor can, if appropriate, be distributed in a completely different manner. Therefore, a very high level of flexibility for handling the consignments is achieved with the omnidirectional floor.

Independently of the storage of the consignments, the at least one sensor device can be connected to a navigation device of the delivery vehicle. In this way, the particular delivery route can be established automatically on the basis of the delivery information for the consignments. In this case, it is possible to take further parameters into account in order to establish the delivery route. With these parameters, the experience of the particular deliverer of the corresponding delivery area and the traffic situation therein can be taken in to account. For example, particular roads, crossroads or zones which have a greater risk of jams or generally lead to delays can be avoided when the delivery route is established. Under certain circumstances, the parameters can also take the time into account, in order for instance to prefer different delivery routes during the rush hour compared with times when there is less traffic.

In order to achieve rapid dispensing of the consignments at the delivery location, a positioning device, for instance as part of the navigation device, can be provided, which identifies where the delivery vehicle is currently located. When this location information is linked to the delivery information for the consignments by a control device, it is possible to automatically identify when the next delivery location will shortly be reached. The dispensing of the at least one consignment to be unloaded next onto the conveying device and, if appropriate, the conveying of the consignment to be dispensed to the dispensing device by means of the conveying device can thus be started automatically. Then, for example, the at least one consignment to be delivered next is already ready to be delivered when the delivery vehicle reaches the delivery location. The delivery can then be carried out either by the deliverer and/or driver of the delivery vehicle or automatically, in particular autonomously. Automatic and/or autonomous delivery further accelerates the delivery and does away with the need for any action on the part of the deliverer, who can consequently concentrate fully on driving and the traffic, unless the delivery vehicle is also following the delivery route autonomously.

In a first particularly preferred method for delivering consignments at different locations along a delivery route, the delivery information and/or the storage information for the consignments is captured via at least one sensor device. The at least one sensor device to this end preferably has at least one sensor which, for the sake of simplicity and of reliably capturing the delivery information and/or storage information, can be an optical sensor. Alternatively or additionally, it is particularly expedient, for reliable capturing of the delivery information and/or storage information, for the delivery information and/or storage information to be captured from a 2D barcode provided on the consignments and/or a 3D barcode. Suitable sensors for this are known from the prior art. The storage information and/or the delivery information is preferably saved by a control device and linked to the corresponding consignments. Which delivery information and/or which storage information belongs to which consignment is thus known. Alternatively or additionally, the delivery information can also be linked with the storage information or with the storage position of the corresponding consignment. In this connection, the storage information preferably clearly defines the storage position, although this is not absolutely necessary in principle. Then, the control device in which the storage information associated with the consignments is saved knows which storage position which consignment with which delivery position is provided in.

According to the method, it is appropriate to determine the delivery route on the basis of the delivery information for the consignments which is captured by the at least one sensor device in order that the delivery can be made more quickly. In this case, a navigation device can guide the delivery vehicle along the delivery route successively to the locations at which the consignments are dispensed. Thus, the navigation device provides not only the delivery route but also the locations at which the individual consignments are intended to be delivered.

If appropriate, the current position of the delivery vehicle while the delivery vehicle is moving along the delivery route can be determined via at least one positioning device. Thus, it is possible to ascertain in a timely manner that the next delivery location at which the at least one next consignment is intended to be delivered is being approached. Thus, it is possible to use the current position of the delivery vehicle to determine which consignment is to be dispensed next and/or the at least one storage position of the at least one consignment to be dispensed next. The dispensing of the at least one consignment to be dispensed next can thus be initiated automatically in a timely manner, without this having to be carried out manually by the deliverer and/or without the delivery location for the at least one consignment to be delivered next having to have already been reached. In this connection, it is further preferred when, in addition to the current location of the delivery vehicle, the delivery route of the delivery vehicle is also taken into account. This ensures that the consignment supposedly to be delivered next is actually the consignment to be delivered next. Alternatively or additionally, a more precise prediction of when the delivery of the consignment to be delivered next should actually take place is thus possible.

During the delivery of the consignments, the consignments to be dispensed in each case next are dispensed or delivered for example in order at the delivery locations which are driven to by the delivery vehicle along the delivery route. For this purpose, the at least one consignment to be dispensed next is preferably dispensed beforehand from the storage position to the at least one conveying device or to the at least one conveying element of the at least one conveying device. The conveying device can then convey the at least one consignment to be dispensed next to the dispensing device, from where the corresponding consignment is dispensed or delivered. The conveying device will in this case preferably convey the consignment to the dispensing device when the location of the delivery vehicle has been used to ascertain that the delivery location linked with the at least one consignment to be delivered next will shortly be reached or has already been reached.

In order to keep the procedure simple and to accelerate the handling of the consignments, the consignments can be dispensed in order to successive storage positions in the delivery vehicle. In this case, it is, for example, particularly effective for the storage position located closest to the at least one dispensing device to be allocated a consignment first of all. Thereafter, the storage positions located further away from the dispensing device, i.e. at a greater distance from the dispensing device, can then be successively allocated. This can continue until all of the storage positions in the delivery vehicle and/or the storage device have been allocated consignments. Alternatively, however, the consignments can also be assigned to particular storage positions on the basis of storage information assigned to the consignments. The storage information can in this case include details relating to the size, particular dimensions, the size of the footprint and/or shape of the footprint. Using this information, it is possible for example to deduce the storage positions in which the consignments can be received and/or how the consignments can be stored in the storage device in a space-saving manner until the consignments are transferred back from the storage positions to the conveying device in order to be delivered from the at least one conveying element of the at least one conveying device at the corresponding delivery locations.

In order to make it easier to load the delivery vehicle with consignments which are intended to be delivered along a delivery route, the consignments can be fed to the receiving device via an opening in the roof, in the upper peripheral region of a side wall and/or in the upper peripheral region of the rear wall. Feeding the consignments in an upper region of the delivery vehicle also has the advantage, in principle, that, when the consignments are conveyed from the receiving device, which can be connected downstream of the corresponding opening in the delivery vehicle, to the dispensing device, to the storage position and/or from the storage position to the dispensing device, the force of gravity can be exploited.

Alternatively or additionally, the loading of the delivery vehicle can be simplified in that the consignments are fed successively to the delivery vehicle or to the receiving device. This is easily possible in that the consignments are transported up separately via a conveyor belt in order for example then to pass, in particular fall or slide, successively through the opening into the delivery vehicle. The separate feeding of the consignments in succession has the advantage that the delivery information for the consignments can be captured reliably by the sensor device. However, it is also possible for consignments to be fed to the delivery vehicle together in groups, wherein a conveyor belt can likewise be provided, if appropriate. If, however, the consignments are fed to the delivery vehicle together in groups anyway, it may be easy and quicker for the consignments to be tipped into the delivery vehicle and/or into the receiving device of the delivery vehicle for example from a cart or some other container via the corresponding opening. It may be preferred in particular in this case, but also in principle, to first of all separate out the consignments, for example with a separating device, before the delivery information is captured by the at least one sensor of the at least one sensor device. The separating out of the consignments can be carried out, if appropriate, in a space-saving manner outside the delivery vehicle and/or in the receiving device of the delivery vehicle. It may be more reliable, however, for separating out to take place only after the receiving device.

Easy and safe handling is achieved for example when the consignments are transported via at least one conveying device in the form of a conveyor belt, a tilt tray conveyor belt and/or a roller conveyor, preferably having omni wheels. In this case, it may be particularly expedient for the conveying device to define several levels in the delivery vehicle. On the corresponding levels, the consignments can then be transported horizontally, if appropriate, and transferred for example to storage positions in the storage device. The consignments can be conveyed easily between at least two, in particular adjacent, levels via chutes and/or roller conveyors.

On at least one level, the consignments can be conveyed, if appropriate, by means of a roller conveyor having omni wheels, specifically along the level and/or to storage positions for the consignments. In this case, it may be appropriate, for simplicity, for the storage positions also to be equipped with omni wheels. It is then possible for the consignments to be conveyed to the storage position and away from the storage position by means of omni wheels. In this case, the flexibility in the conveying of the consignments with the omni wheels can be exploited in a particularly effective manner. It is also possible for a continuous omnidirectional floor having omni wheels to be provided on one level of the delivery vehicle. In this way, it is possible for different portions of the same floor to be used as a conveying device or conveying element and as a storage device or storage positions. The omni wheels make it possible to transport the consignments, if appropriate, along different paths along the corresponding level, for instance in order to transfer the consignments to different storage positions. No further guiding means is then required for this. In order for it to be possible to exploit the functionality of the omni wheels in a particularly efficient manner, the latter are preferably driven in three different circumferential directions. In this case, it is particularly suitable for the axes of rotation of the omni wheels to intersect at an angle of 120° and/or 60° and/or to be oriented parallel to one another. At the same time or alternatively, the omni wheels can rotate at different speeds. Both of these can be used to convey the consignments on different, in particular curved, paths along the roller conveyor.

If the consignments are temporarily stored on a part of the roller conveyor, preferably having omni wheels, said roller conveyor accordingly forming at least one storage position, different parts of the roller conveyor can be used as a conveying element or as a storage device.

BRIEF DESCRIPTION OF THE SEVERAL VIEWS OF THE DRAWING

The invention is explained in more detail in the following text with reference to a drawing that illustrates only one exemplary embodiment. In the drawing.

DETAILED DESCRIPTION OF THE INVENTION

Figure 1:
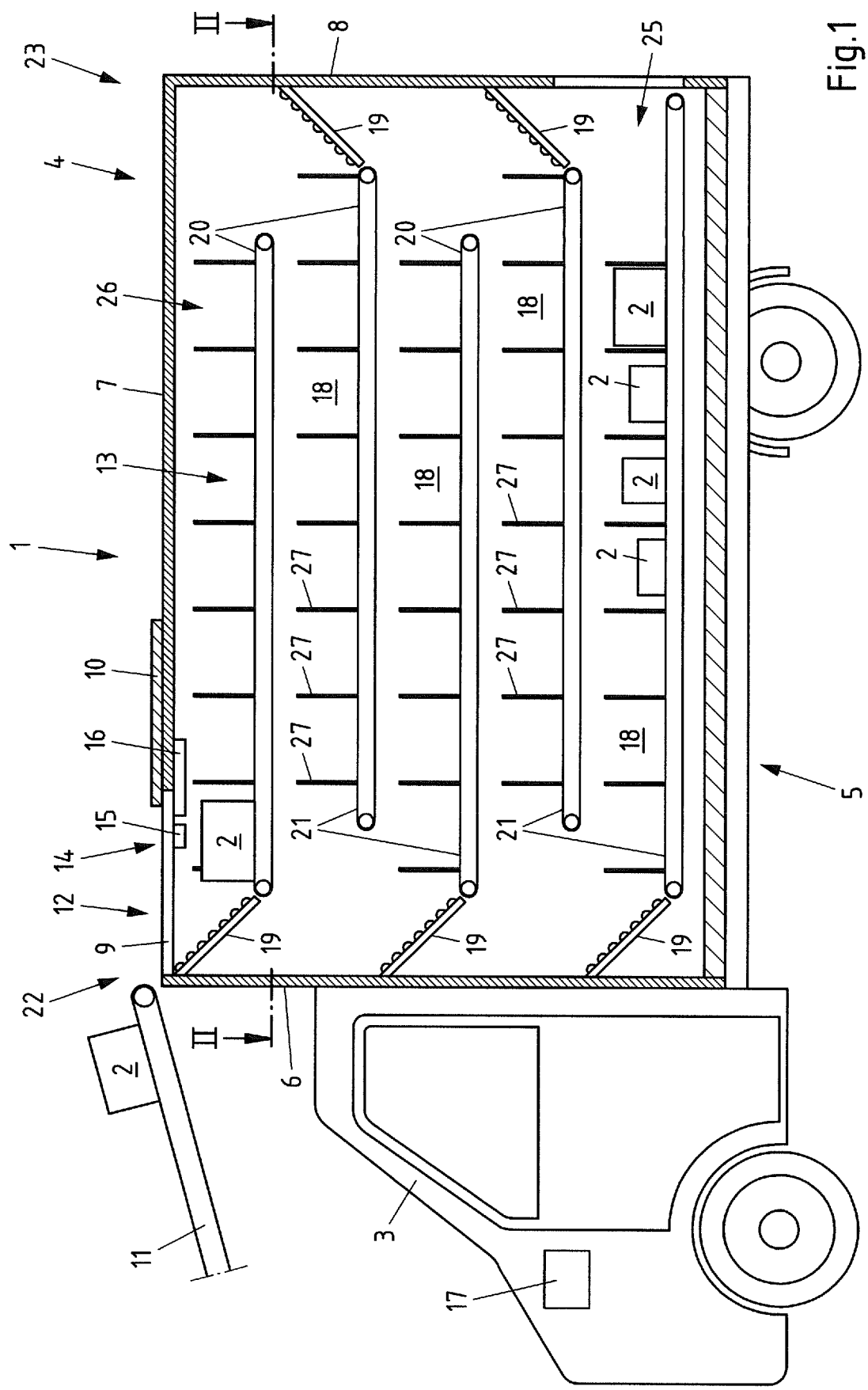
FIG. 1 shows a schematic, vertical sectional view of a first delivery vehicle according to the invention for carrying out the delivery method according to the invention while it is being loaded with consignments.

FIG. 1 illustrates a delivery vehicle 1 for delivering consignments 2 at different locations along a delivery route. The delivery vehicle 1 has a driver's cab 3 and a structure 4 for receiving the consignments 2. The driver's cab 3 may be dispensed with, if appropriate, if the delivery vehicle 1 is an autonomous delivery vehicle 1. This is possible in principle but of relatively minor importance for the further configuration of the delivery vehicle 1 and the method for delivering the consignments 2 by means of the delivery vehicle 1. The structure 4 of the delivery vehicle 1 that is illustrated and to this extent preferred is a box body having fixed side walls 5, a fixed front wall 6, a fixed roof 7 and a fixed rear wall 8, having swing doors for entering and/or loading the structure, if appropriate. In principle, however, other structures are conceivable.

In the case of the delivery vehicle 1 that is illustrated and to this extent preferred, loading with consignments 2 for a delivery round or delivery route takes place via the roof 7. To this end, the roof 7 is provided with an opening 9, through which the consignments 2 can pass into the structure 4. The opening 9 can be closed by a closure element 10 which is not illustrated in detail. The closure element 10 can in this case be configured for example as a flap or slide. Alternatively or additionally, the closure element 10 can be opened and closed in a manner driven by an electric motor. This can be initiated automatically or by the deliverer.

FIG. 1 illustrates the loading of the delivery vehicle 1 with consignments 2, which are transported separately, that is to say in a manner already separated out, to the opening 9 in the roof 7 via a conveyor belt 11. The consignments 2 successively slide or fall off the end of the conveyor belt 11 through the opening 9 into the structure 4 of the delivery vehicle 1 and in the process pass into the receiving device 12 of the delivery vehicle 1. The receiving device 12 of the delivery vehicle 1 is in this case provided in an initial region of a conveying device 13 for conveying the consignments 2 and serves to receive the consignments 2 in the delivery vehicle 1, while the conveying device 13 serves to convey the consignments 2 in the delivery vehicle 1. In the delivery vehicle 1 that is illustrated and to this extent preferred, a sensor device 14 comprising at least one sensor 15, which in the present case is configured as an optical sensor 15, is assigned to the receiving device 12, if not integrated into the receiving device 12.

The consignments 2 that pass successively via the opening 9 into the receiving device 12 are transported away successively out of or from the receiving device 12 by the conveying device 13. In this case, the consignments 2 are guided past the at least one sensor 15 of the sensor device 14 by the conveying device 13, wherein barcodes applied to the consignments 2 are captured by the sensor 15 and the delivery information for the consignments 2 that is contained in the barcodes is read. The delivery information contains for example the details of the locations at which the consignments 2 are intended to be delivered. The delivery information is either determined by a control device 16 or passed on to a control device 16. On the basis of the delivery information for all of the consignments 2, a delivery route that is particularly suitable for the delivery of the consignments 2 can be determined, and this can likewise be done by the control device 16. However, the delivery route can also be defined by a navigation device 17 which is connected to the control device 16 and can take the current traffic situation into account. The navigation device 17 guides the deliverer along the delivery route and also directs the deliverer to the respective delivery locations for the consignments 2 loaded on the delivery vehicle 1. In the case of an autonomous delivery vehicle 1, the delivery route is used directly to guide the delivery vehicle 1 successively to the delivery locations for the consignments 2 to be delivered.

In methods that are illustrated and to this extent preferred for delivering consignments 2 with the delivery vehicle 1, the consignments 2 conveyed by a conveying device 13 are conveyed successively in each case as far as the last free storage position 18. To this end, conveying elements 19, 20 are provided in the delivery vehicle 1, which define a series of levels 21 in the delivery vehicle 1. The individual levels 21 are connected together via roller conveyors 19 at the front side 22 or the rear side 23 of the structure 4. On the individual levels, tilt tray conveyors 20 are provided, which, in a similar manner to a belt conveyor, have tilt trays 24 arranged in a row and in a circulating manner. A consignment 2 can be received by each individual tilt tray 24 and is then transported onward in the transport direction of the tilt tray conveyor 20. If appropriate, the consignments 2 are ejected from the tilt tray conveyor 20 at the end of the corresponding level 21 and are transported by a roller conveyor 19 or chute provided there to the tilt tray conveyor 20 of the next level 21. There, the corresponding consignment 2 is again received by a tilt tray 24 of the tilt tray conveyor 20 provided there and transported onward in the transport direction of this tilt tray conveyor 20. The transport directions of the tilt tray conveyors 20 on two successive levels 21 are directed in opposite directions to one another. If one tilt tray conveyor 20 transports the consignments 2 toward the rear side 23 of the delivery vehicle 1, then the next tilt tray conveyor 20 transports the consignments 2 toward the front wall 6 of the structure 4 of the delivery vehicle 1. The number of levels 21 provided in the delivery vehicle 1 can be made dependent on the maximum permissible size of the consignments 2 to be delivered, on the type of delivery vehicle 1 and on the size of the structure 4 of the delivery vehicle 1.

In a preferred method, the consignments 2 are transported as far in the direction of the dispensing device 25 as free storage positions 18 are still available. The storage position 18 or storage positions 18, located closest to the dispensing device 25, of the storage device 26 is/are allocated first. The next consignments 2 are then each fed to the last free storage positions 26. In the delivery vehicle 1 that is illustrated and to this extent preferred, the storage device 26 extends substantially along the conveying device 13. The storage device 26 is in this case likewise provided in a manner distributed over the different levels 21 of the conveying device 13.

Figure 2:
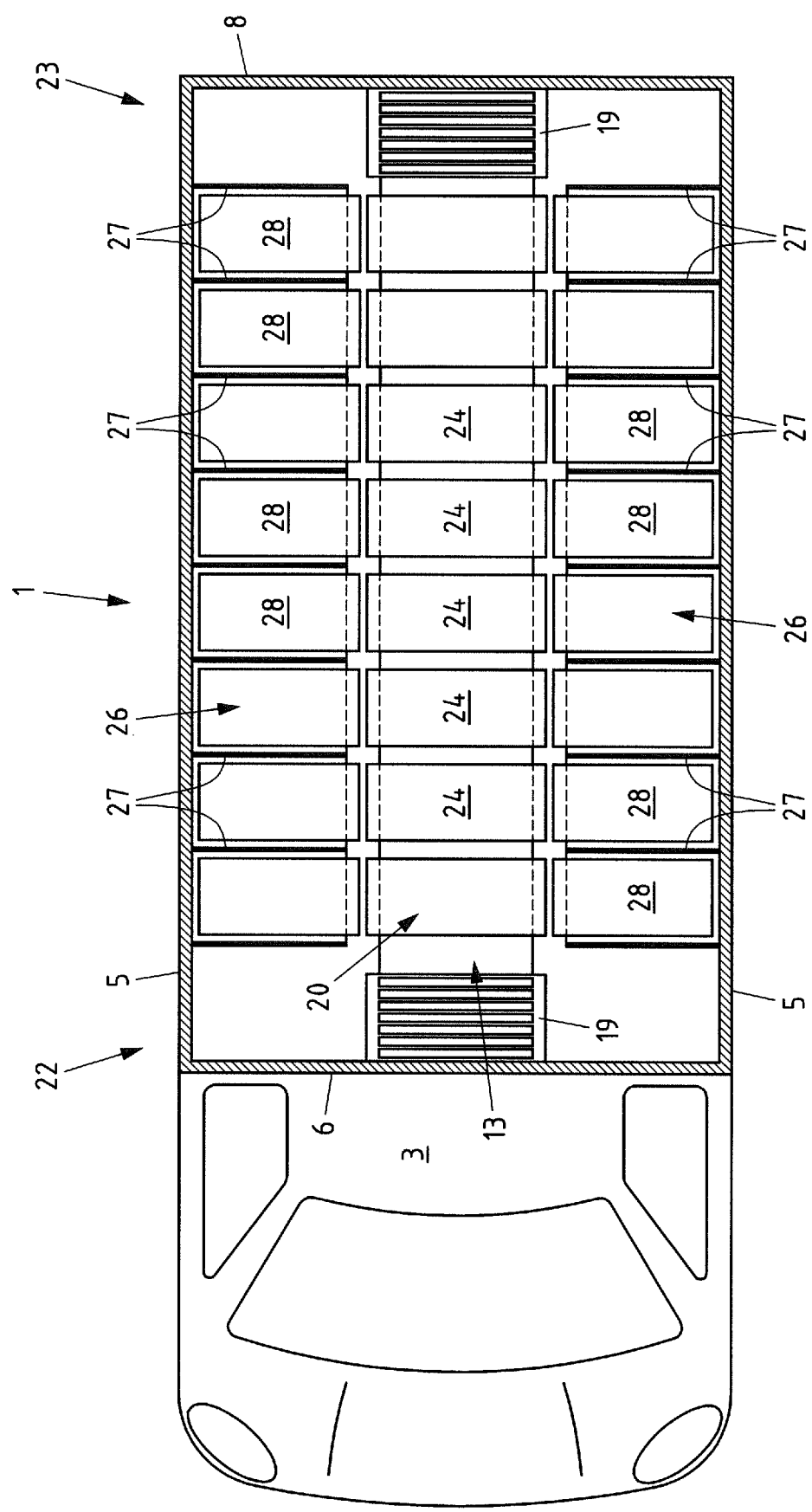
FIG. 2 shows a schematic, horizontal sectional view of the delivery vehicle from FIG. 1.

A level of the delivery vehicle 1 is illustrated in FIG. 2. In the middle of the level 21, the tilt tray conveyor 20 extends in the longitudinal direction of the delivery vehicle 1. Provided at the respective longitudinal ends of the tilt tray conveyor 20 are the roller conveyors 19 which connect one level 21 to the level 21 provided therebeneath. Provided on both sides of the tilt tray conveyor 20 are storage positions 18 for the consignments 2. In order to receive the consignments 2 in the storage positions 18, the storage device 26 has tilt trays 24. In the delivery vehicle 1 that is illustrated and to this extent preferred, separators 27 are provided between the individual tilt trays 24 of one level 21, said separators 27 preventing any unintentional slipping of consignments 2 from a tilt tray 24 into the adjacent tilt tray 24, for instance if the delivery vehicle 1 brakes sharply or travels along a steep section of road.

Figure 3:
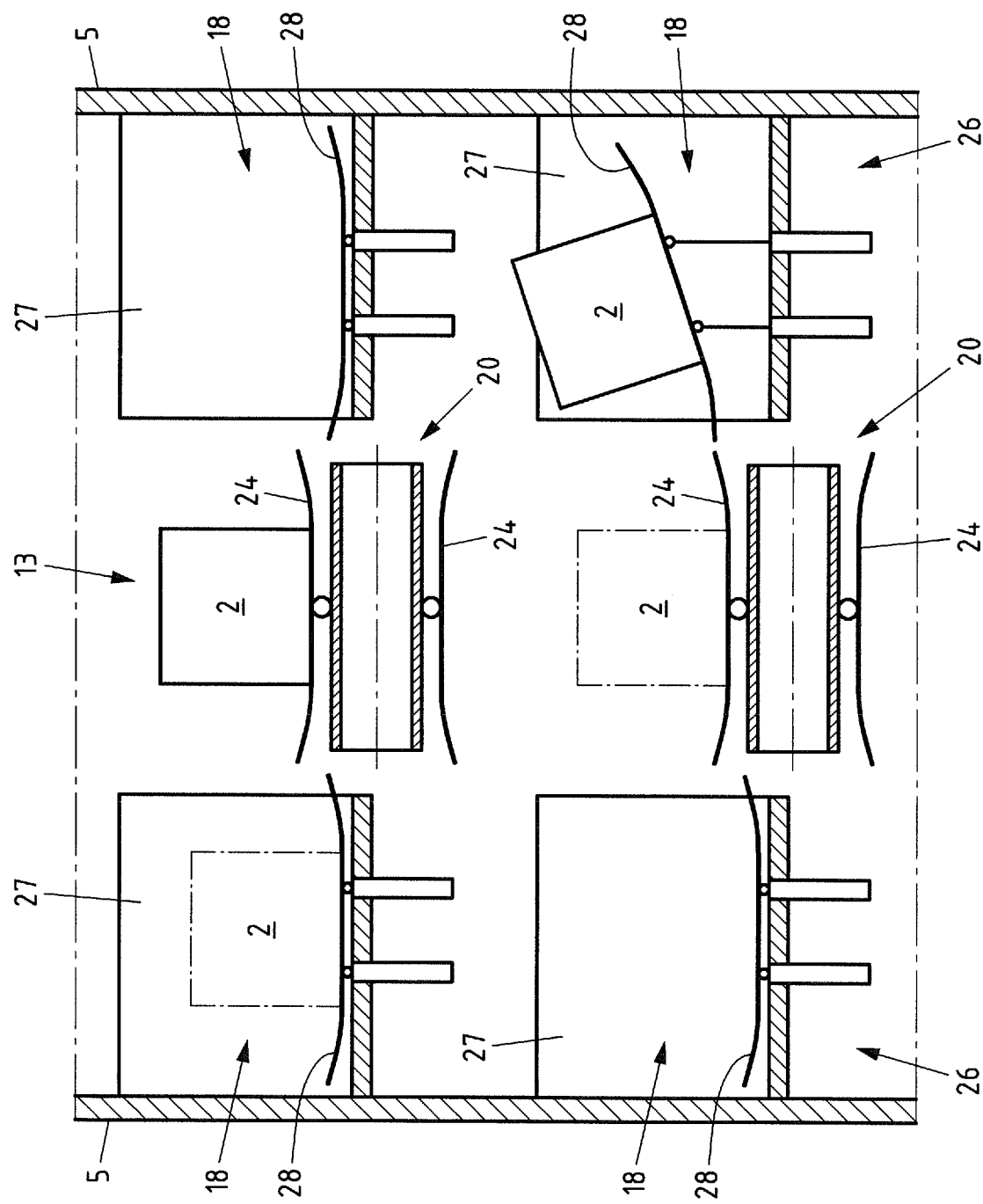
FIG. 3 shows a schematic vertical cross-sectional view of the loading and unloading of the delivery vehicle from FIG. 1.

FIG. 3 schematically illustrates how the consignments 2 are dispensed from the tilt trays 24 of the tilt tray conveyor 20 onto the tilt trays 24 of the storage device 26. The figure also schematically illustrates how the consignments 2 are dispensed back from the tilt trays 24 of the storage device 26 onto the tilt trays 24 of the conveying device 13. The tilt trays 24 of the tilt tray conveyor 20 can be tilted to both sides, wherein the tilt trays 24 are then inclined such that the consignments 2 slide to the side into the tilt trays 28 of the storage device 26. When consignments 2 are intended to be transferred back to the tilt trays 24 of the conveying device 13 from the tilt trays 28 of the storage device 26 again, the corresponding tilt trays 28 of the storage device 26 are inclined such that the consignments 2 slide into the adjoining tilt tray 24 of the conveying device 13. The consignments 2 can then be transported to the dispensing device 25 by means of the conveying device 13 or by way of the conveying elements 19, 20 of the conveying device 13. Once they have arrived there, the consignments 2 can be removed for example by the deliverer and delivered at the delivery location.

Figure 4:
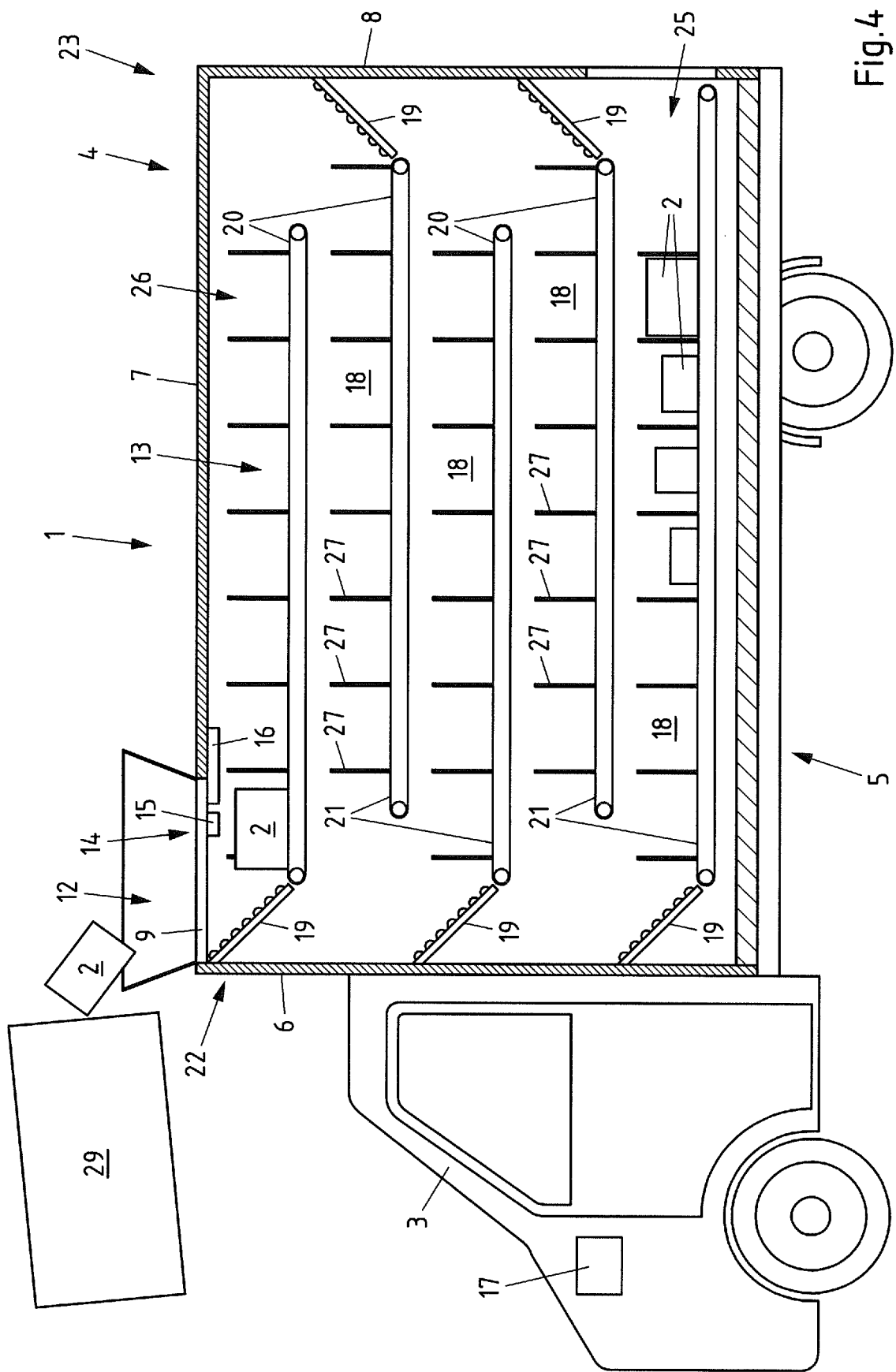
FIG. 4 shows a view as per FIG. 1 of the delivery vehicle from FIG. 1 during an alternative type of loading of the delivery vehicle with consignments.

FIG. 4 illustrates the delivery vehicle 1 from FIG. 1 during an alternative type of loading with consignments 2. Rather than being fed individually and successively to the delivery vehicle 1, the consignments 2 are tipped from a cart 29 into the delivery vehicle 1, in particular into the receiving device 12, through the opening 9 in the roof 2. The corresponding configuration of the receiving device 12 or a specific separating device 30 can then ensure that the consignments 2 tipped into the receiving device 12 are separated out before the consignments 2 are guided past the at least one sensor 15 of the sensor device 14. This ensures that the delivery information for the consignments 2 is captured reliably. The further handling of the consignments 2 then takes place as has already been described above.

Figure 5:
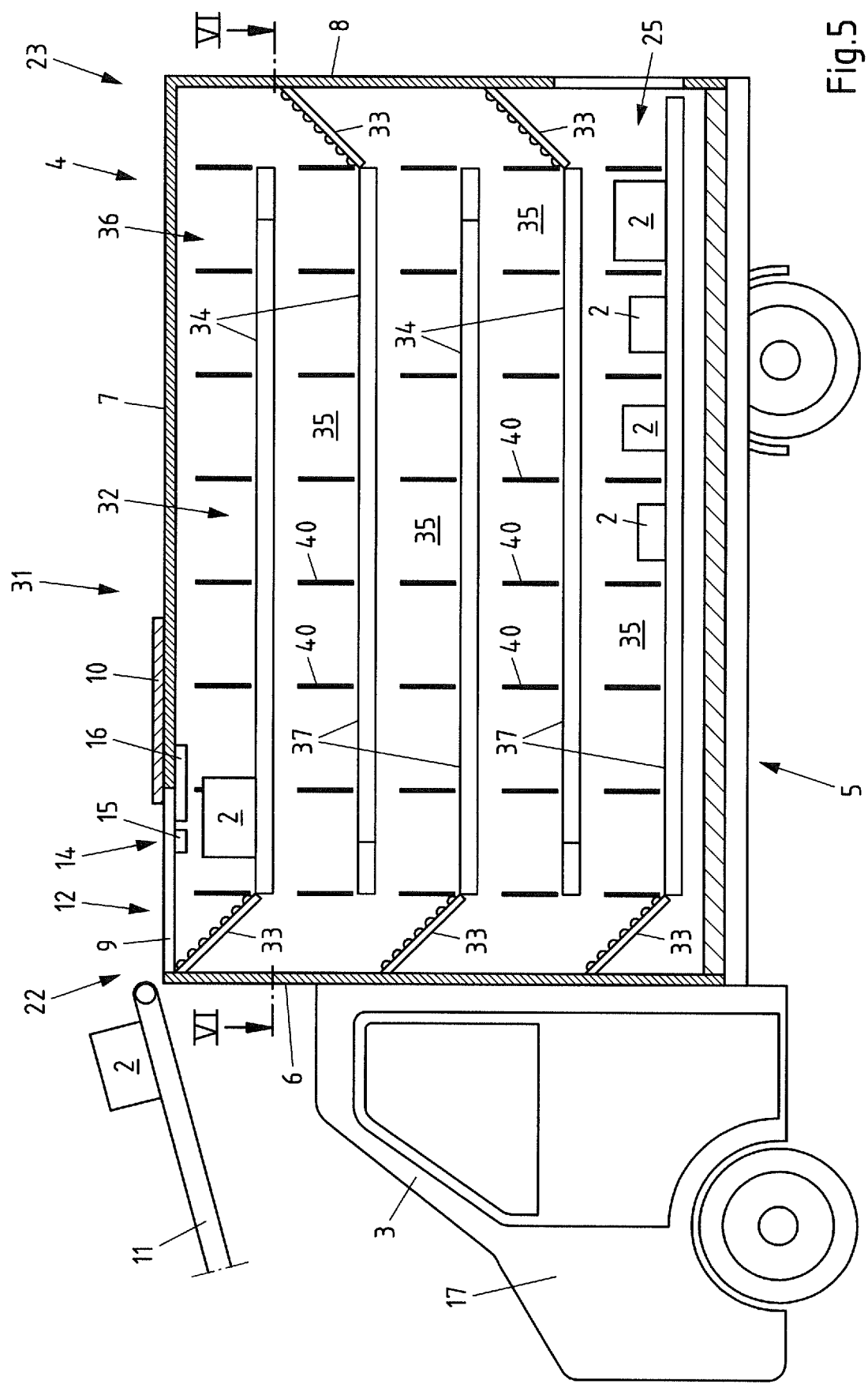
FIG. 5 shows a schematic, vertical sectional view of a second delivery vehicle according to the invention for carrying out the delivery method according to the invention while it is being loaded with consignments.

FIG. 5 illustrates an alternative delivery vehicle 31, which can be loaded with consignments 2 in principle in the two above-described manners. The delivery vehicle differs from the delivery vehicle from FIG. 1 substantially only with regard to the devices described in more detail below, and so identical components have identical reference signs. In the case of the delivery vehicle 31 in FIG. 5, too, the conveying device 32 has several conveying elements 33, 34 which define different levels 21 arranged one above another. The consignments 2 are transported to the dispensing device 25 from top to bottom via the different levels 21 and are preferably temporarily stored in a storage position 35 of the storage device 36 on this path. In contrast to the delivery vehicle 1 according to FIG. 1, no tilt tray conveyors 20 are provided on the levels 21 of the delivery vehicle 31 according to FIG. 5, and also no tilt trays 28 for receiving the consignments 2 are provided in the storage device 36. The levels 21 are formed by what are referred to as omnidirectional floors 37 which provide both the conveying element 34 of the corresponding level 21 and the storage positions 35 of the storage device 36 of the corresponding level 21.

Figure 6:
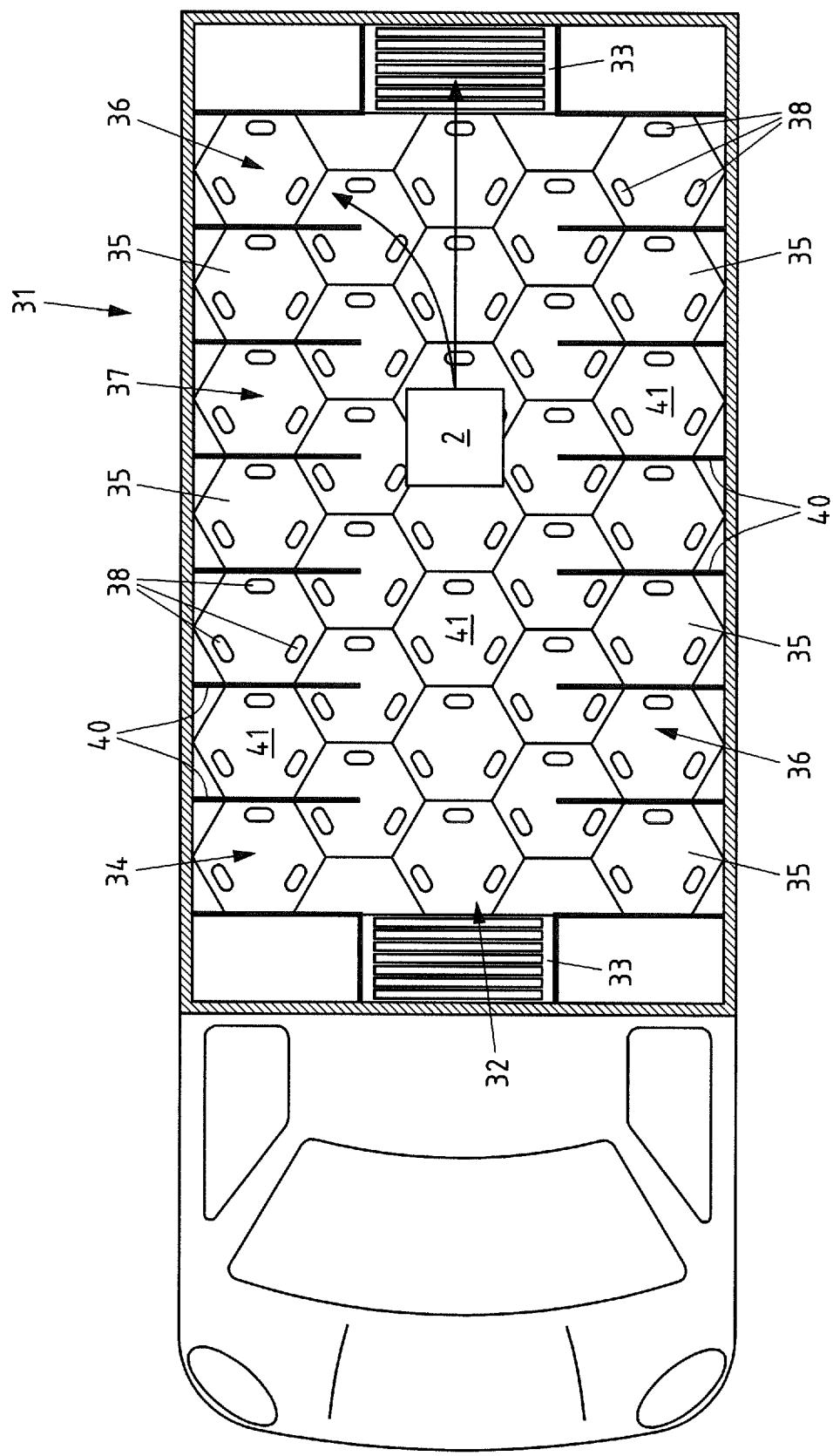
FIG. 6 shows a schematic, horizontal sectional view of the delivery vehicle from FIG. 5.

As illustrated in particular in FIG. 6, the omnidirectional floors 37 have omni wheels 38, which are also referred to as omnidirectional wheels 38. The omnidirectional wheels 38 have rollers 39 which are distributed around their circumference and the axes of rotation of which are oriented perpendicularly to the axes of rotation of the omni wheels 38. In the circumferential direction of the omnidirectional wheels 38, it is thus possible for the consignments 2 to be transported by the omnidirectional wheels 38. Although the omnidirectional wheels 38 cannot transport the consignments 2 perpendicularly thereto, the omnidirectional wheels 38 do not prevent transport in this direction. The omnidirectional wheels 38 of the omnidirectional floors 37 have axes of rotation which point in different directions and are also parallel to the particular omnidirectional floor 37. In addition, the omnidirectional wheels 38 are driven individually and independently of one another via a controller, and, if appropriate, the transport of the consignments 2 along the omnidirectional floors 37 is monitored via at least one, in particular optical, sensor. Therefore, each consignment 2 can be transported by way of the omnidirectional wheels 38 in any desired direction and along virtually any desired path over the omnidirectional floor 37.

The consignments 2 can be transported for example in a rectilinear manner over the omnidirectional floor 37 in order to feed consignments 2 to the next level 21. However, the consignments 2 can also be moved to particular storage positions 18 which are formed by a part of the omnidirectional floor 37. This has the advantage that no complicated and time-consuming transfer of the consignment 2 from the conveying device 32 to the storage position 35 has to take place. In order that the consignments 2 do not slip during the delivery round, the consignments 2 can be stored directly next to one another in corresponding storage positions 35. In this connection, it is appropriate for the at least one sensor 15 of the at least one sensor device 14 to capture not only the delivery information but also an item of storage information which describes the space required for storing the consignment 2. When the delivery vehicle 31 is partially unloaded, in particular when the order of delivery of the consignments 2 is not taken into account when the consignments 2 are allocated to storage positions 35, the consignments 2 can nevertheless unintentionally slip under certain circumstances in the partially unloaded delivery vehicle 31. In order to avoid this, it is also possible, in the case of omnidirectional floors 37, as in the delivery vehicle 1 illustrated in FIG. 1, to provide what are referred to as separators 40, which separate adjacent storage positions 18, 35 from one another.

Figure 7:
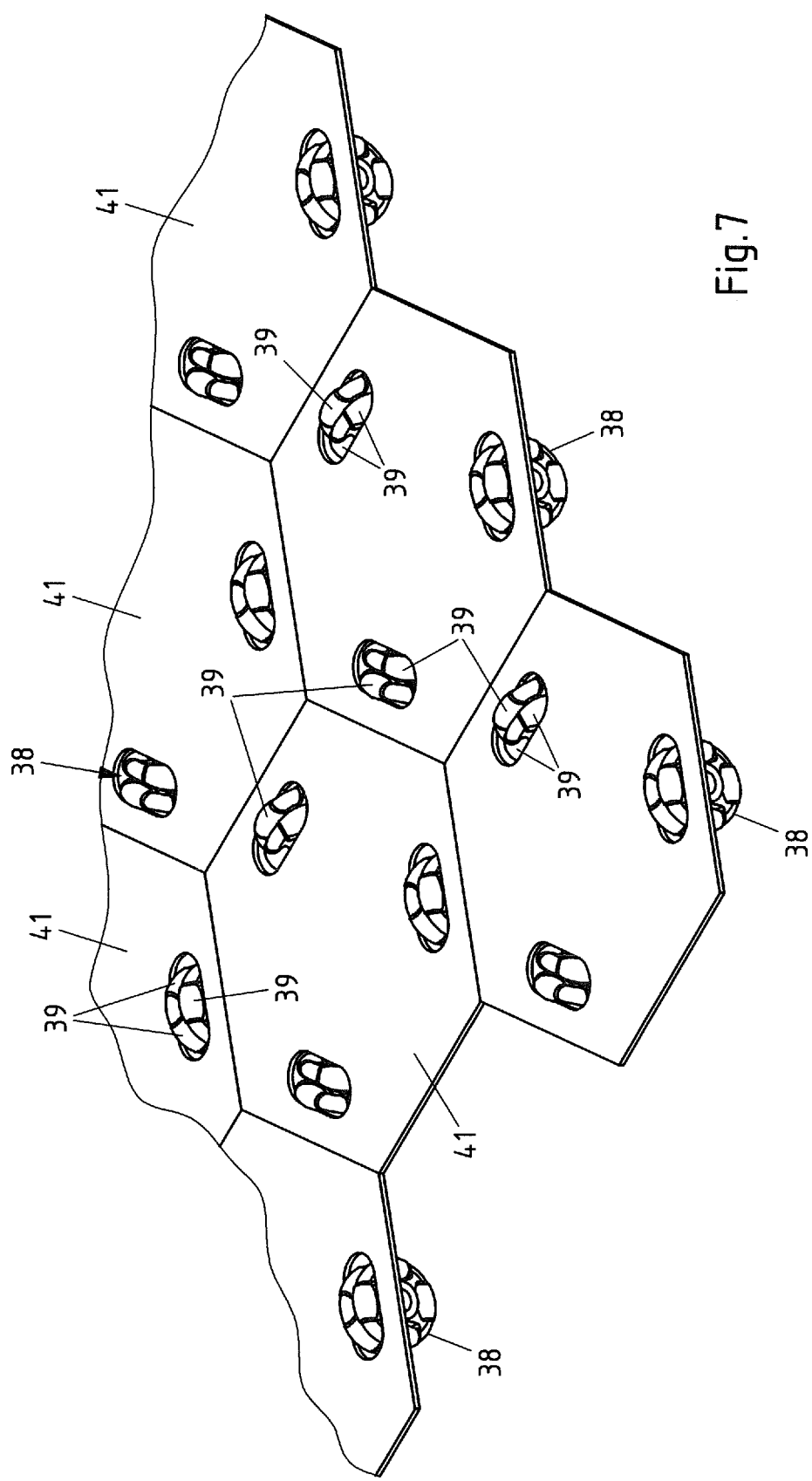
FIG. 7 shows a perspective sectional view of a detail of a conveying element of the conveying device of the delivery vehicle from FIG. 5.

In the case of the delivery vehicle 31 that is illustrated in FIG. 5 and to this extent preferred, the omnidirectional floors 37 are constructed in a modular manner from a plurality of identical modules 41, as are schematically illustrated in FIG. 7. Each of the modules 41 has three different omni wheels 38, the axes of rotation of which are offset with respect to one another in, or at least parallel to, a plane and through in each case 120° and/or 60°. Each of the omni wheels 38 can be driven in two opposite directions and at several different speeds. Two rows of rollers 39 are arranged all around the circumference, specifically always alternately with one another. The axes of rotation of the rollers 39 are oriented perpendicularly to the circumferential direction of the omni wheels 38. Consignments 2 which rest simultaneously on several of these omni wheels 38 can be imparted a movement component in virtually any desired direction parallel to the plane of the omnidirectional floor 37.

LIST OF REFERENCE SIGNS

1 Delivery vehicle
2 Consignment
3 Driver's cab
4 Structure
5 Side wall
6 Front wall
7 Roof
8 Rear wall 9 Opening
10 Closure element
11 Conveyor belt
12 Receiving device
13 Conveying device
14 Sensor device
15 Sensor
16 Control device
17 Navigation device
18 Storage position
19 Conveying element
20 Conveying element
21 Level
22 Front side
23 Rear side
24 Tilt tray
25 Dispensing device
26 Storage device
27 Separator
28 Tilt tray
29 Cart
30 Separating device
31 Delivery vehicle
32 Conveying device
33 Conveying element
34 Conveying element
35 Storage position
36 Storage device
37 Omnidirectional floor
38 Omni wheel
39 Roller
40 Separator
41 Module All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A delivery vehicle for delivering consignments at different locations on a delivery route, having at least one receiving device for receiving the consignments, having at least one sensor device associated with the receiving device for separately capturing delivery information for the consignments received via the receiving device, wherein the delivery information specifies the locations at which the consignments need to be dispensed or delivered, having at least one storage device for storing the received consignments during the delivery of other consignments, and having at least one conveying device for conveying the received consignments from the receiving device to storage positions in the storage device and from the storage positions in the storage device to a dispensing device for dispensing the consignments at the particular location for delivery of the consignments;

wherein the receiving device has an opening provided in the roof of the delivery vehicle, for receiving the consignments via the roof, and/or wherein, in order for the consignments to be fed via a side wall and/or via the rear wall, the receiving device is assigned to an upper peripheral region of a side wall and/or to an upper peripheral region of the rear wall.

2. The delivery vehicle according to claim 1, wherein the sensor device has at least one optical sensor, and/or in that the consignments have delivery information in the form of 2D barcodes and/or 3D barcodes, preferably on several sides of the consignments.

3. The delivery vehicle according to claim 1, wherein the conveying device is configured to convey the consignments, preferably in steps, from an upper receiving position into a lower dispensing position, and in that, preferably, the conveying device defines a plurality of conveying levels that are arranged one above another and are connected in particular via chutes or roller conveyors.

4. The delivery vehicle according to claim 1, wherein the conveying device comprises, in particular on each level of the conveying device, at least one conveyor belt, at least one tilt tray conveyor and/or at least one roller conveyor, preferably having omni wheels, and/or in that the storage device is formed at least in part by the roller conveyor and/or has tilt trays for transferring temporarily stored consignments to the conveying device.

5. The delivery vehicle according to claim 1, wherein the conveying device comprises, in particular on each level of the conveying device, at least one roller conveyor, having omni wheels, wherein the omni wheels are arranged in, preferably at least three, different orientations, and/or in that the omni wheels are driven in different directions and/or at different circumferential speeds.

6. The delivery vehicle according to claim 1, wherein the conveying device and/or the storage device are assigned at least one guiding means for dispensing the consignments from the conveying device to particular storage positions in the storage device and/or from particular storage positions in the storage device to the conveying device.

7. The delivery vehicle according to claim 1, wherein a control device for controlling the conveying device so that the consignments are stored in particular storage positions in the storage device is provided, and in that, preferably, the control device is configured so that the consignments are stored in order and/or on the basis of storage information captured by means of at least one sensor device.

8. The delivery vehicle according to claim 1, wherein the at least one sensor device is connected to a navigation device for determining the delivery round on the basis of the delivery information for the consignments, and/or in that a positioning device for conveying consignments to the dispensing device on the basis of the position of the delivery vehicle and the delivery information for the consignments is provided.

9. A method for delivering consignments at different locations along a delivery route with a delivery vehicle,
in which the consignments to be delivered are transferred to the delivery vehicle in an unsorted manner via at least one receiving device of the delivery vehicle, wherein the receiving device has an opening provided in the roof of the delivery vehicle, for receiving the consignments via the roof, and/or wherein, in order for the consignments to be fed via a side wall and/or via the rear wall, the receiving device is assigned to an upper peripheral region of a side wall and/or to an upper peripheral region of the rear wall,
in which delivery information for the received consignments is captured separately by at least one sensor device associated with the receiving device, wherein the delivery information specifies the locations at which the consignments need to be dispensed or delivered,
in which the consignments are conveyed to storage positions in the at least one storage device by at least one conveying device,
in which the consignments are temporarily stored in the storage positions,
in which the consignments are conveyed from the storage positions to at least one dispensing device by the conveying device, and
in which the consignments conveyed to the dispensing device are dispensed at different locations on the delivery route.

10. The method according to claim 9,
in which the delivery information and/or storage information, provided on the consignments, in particular as a 2D barcode and/or 3D barcode, is captured via at least one, preferably optical, sensor of a sensor device and stored in a manner assigned to the corresponding consignments and/or to the storage positions of the corresponding consignments.

11. The method according to claim 9,
in which the delivery route is determined on the basis of the delivery information, and
in which, preferably, a navigation device guides the delivery vehicle along the delivery route successively to the locations at which the consignments are dispensed.

12. The method according to claim 9,
in which at least one positioning device determines the current position of the delivery vehicle along the delivery route, and
in which, on the basis of the current position of the delivery vehicle and, preferably, of the delivery route determined on the basis of the delivery positions, the at least one consignment to be dispensed next and/or the at least one storage position of the at least one consignment to be dispensed next is determined.

13. The method according to claim 9,
in which at least one consignment to be dispensed next is dispensed from the storage position to the at least one conveying device, and
in which, preferably, the conveying device conveys the at least one consignment to be dispensed next to the dispensing device.

14. The method according to claim 9,
in which the consignments are transferred to storage positions in the at least one storage device in order and/or on the basis of storage information assigned to the consignments.

15. The method according to claim 9,
in which the consignments are fed to the receiving device opening in the roof, in the upper peripheral region of a side wall and/or in the upper peripheral region of the rear wall, and/or
in which the consignments are poured into the receiving device successively via a conveying device, in particular a conveyor belt, and/or jointly as a series of consignments, and/or
in which the consignments are separated out at least partially, in particular by means of a separating device, in the receiving device and subsequently fed separately to the sensor device in order for the delivery information and/or storage information to be captured.

16. The method according to claim 9,
in which the consignments are conveyed via at least one conveying device in the form of a conveyor belt, a tilt tray conveyor and/or a roller conveyor, preferably having omni wheels, in particular over at least one level, preferably over different levels, and
in which, preferably, the consignments are conveyed between at least two, in particular adjacent levels via chutes and/or roller conveyors.

17. The method according to claim 16,
in which the consignments are transported successively along a level in different directions, preferably along a curved path, by means of a roller conveyor having omni wheels, and
in which, preferably, the omni wheels are driven in three different directions and/or at different speeds while the consignments are being transported.

18. The method according to claim 16,
in which the consignments are temporarily stored in storage positions configured as part of the roller conveyor, preferably having omni wheels.

* * * * *

UNITED STATES PATENT AND TRADEMARK OFFICE
CERTIFICATE OF CORRECTION

Page 1 of 1

PATENT NO. : 10,990,910 B2
APPLICATION NO. : 15/614787
DATED : April 27, 2021
INVENTOR(S) : Heike Bischoff et al.

It is certified that error appears in the above-identified patent and that said Letters Patent is hereby corrected as shown below:

On the Title Page

Item (71) and Item (73):
The City of Inventor/Applicant, Heike Bischoff, is listed as "Cologne" and should be --Köln--
The City of Inventor/Applicant, Holger Schneebeck, is listed as "Cologne" and should be --Köln--

In the Claims

Claim 15, Line 2 reads "in which the consignments are fed to the receiving device" and should read --in which the consignments are fed to the receiving device via the--

Signed and Sealed this
First Day of June, 2021

Drew Hirshfeld
*Performing the Functions and Duties of the*
*Under Secretary of Commerce for Intellectual Property and*
*Director of the United States Patent and Trademark Office*